July 7, 1953 W. H. WORK 2,644,610
AIR VENT CAP FOR OIL DRUMS
Filed Oct. 24, 1950
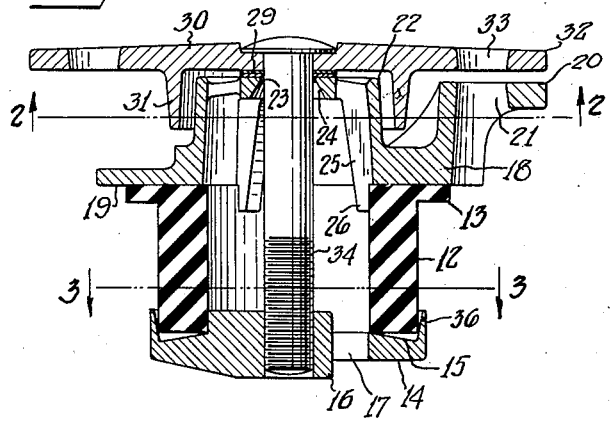
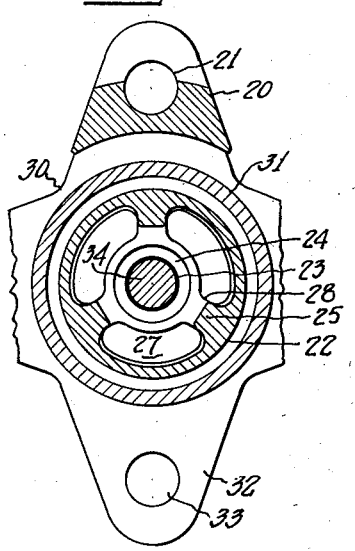
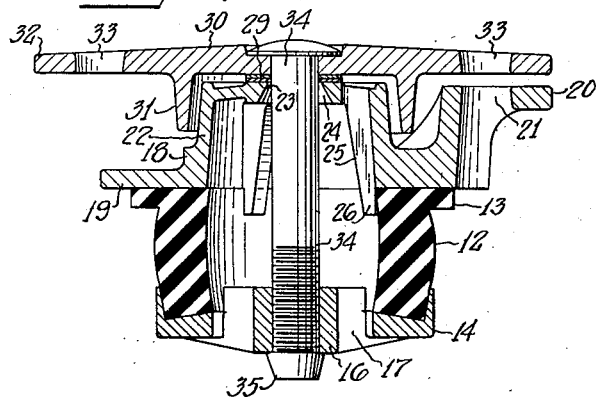
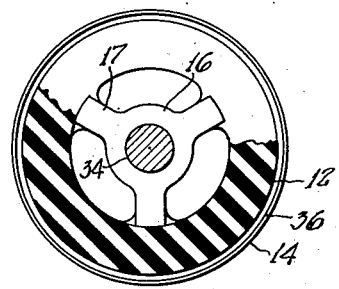
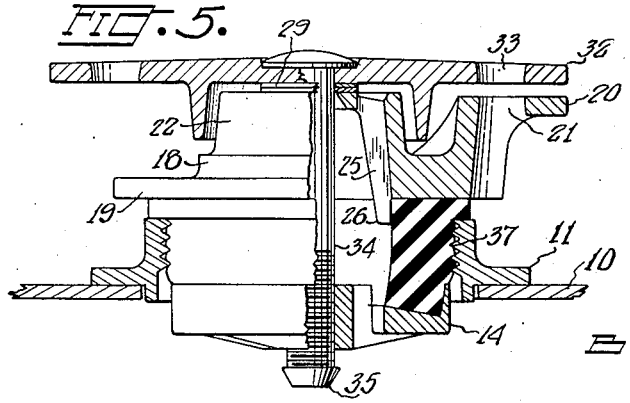
INVENTOR
WORTH H. WORK
ATTORNEY Patented July 7, 1953

2,644,610

UNITED STATES PATENT OFFICE 2,644,610

AIR VENT CAP FOR OIL DRUMS

Worth H. Work, Portland, Oreg.

Application October 24, 1950, Serial No. 191,756

2 Claims. (Cl. 220—44)

This invention relates to oil drums and particularly to an air vent cap therefor.

The main object of this invention is to provide a simple and efficient air vent cap whereby a filler opening may be tightly sealed, or the seal broken sfficiently to admit air without danger of admitting moisture from rain, sprinklers or condensation.

The second object is to construct a cap which will operate satisfactorily under unfavorable conditions.

The third object is to provide a cap which may be locked in its sealed or unsealed positions.

I accomplish these and other objects in a manner set forth in the following specification as illustrated in the accompanying drawing, in which:

Fig. 1 is a section through the cap partially assembled.

Fig. 2 is a section taken along the line 2—2 in Fig. 1.

Fig. 3 is a section taken along the line 3—3 in Fig. 1.

Fig. 4 is a section showing the rubber sleeve partially expanded and the bolt end riveted over.

Fig. 5 is a broken section showing the relation of the cap to an oil drum.

Like numbers of reference refer to the same or similar parts throughout the several views.

Referring in detail to the drawing, there is shown a part of an oil drum head 10 to which is secured a threaded ring 11 normally closed by a threaded plug (not shown).

My device includes a cylindrical rubber sleeve 12 having an outturned flange 13. On the bottom end of the sleeve 12 is a recessed washer 14 having a sloping face 15 engaging the lower end of the sleeve 12.

In the center of the washer 14 is a threaded hub 16 which is held in the washer 14 by the spokes 17.

On the top or flanged end of the sleeve 12 is a cap plate 18 whose flange 19 bears against the flanged end 13.

The cap plate 18 has formed thereon an outturned lug 20 having an opening 21 formed therethrough, adapted to receive the hasp on a padlock (not shown). On the plate 18 is formed a central hub 22 having a hole 23 formed in the center thereof, said hole being flared outwardly on its under side 24. Ribs 25 extend along the interior of the hub 22 and their ends 26 project into the sleeve 12 for centering purposes. Openings 27 are formed between the spokes 28. Washers 29 are placed on the hub 22. On top of the washers 29 is placed a hand wheel 30 having a depending flange 31 which extends down around the outside of the hub 22.

The hand wheel 30 has four radiating spokes 32, each of which is provided with a hole 33, any one of which can mesh with the hole 21.

A screw 34 passes downwardly through the hand wheel 30, the washers 29 and the hub 22, and threads into the hub 16, after which its end 35 is headed over to prevent the escape thereof.

It will be noted in Fig. 1 that the face 36 is substantially normal to the face 15, neither of which fully contact the sleeve 12 until the assembly is completed, as shown in Fig. 4, at which time a bulging action is transmitted to the sleeve 12. If, on the other hand, the screw 34, which is driven tightly into the hand wheel 30, is rotated in the proper direction, then the sleeve 12 is further expanded and contacts the threads 37 in the ring 11.

It can be seen that by this simple and inexpensive contrivance, a perfect seal is provided for oil drum filler openings and that this seal may be broken in a manner to admit air without admitting water, it being assumed that water is permitted to drain away from the top of the drum before it can run over the highest point in the hub 22.

It will be further observed that once the hand wheel 30 has been turned to a tightened position and locked there, then there is no way of unscrewing the cap from the opening unless it be first unlocked and the hand wheel itself rotated to the releasing position shown in Fig. 4.

Attention is drawn to my United States Patent 2,566,816, issued September 4, 1951, over which the device described herein is an improvement.

I claim:

1. An air vent cap for oil drums consisting of a resilient cylindrical sleeve having an outturned flange at one end and having a washer at the other end extending part way into said sleeve and having an upturned flange around the outer rim receiving said sleeve, said washer having vent openings therein, a cap on said sleeve having an upturned vented hub, said hub having ribs projecting into said sleeve, a hand wheel having a downturned flange spaced from and encircling said hub, a screw secured to said hand wheel and threaded into said washer, and means for locking said hand wheel against rotation with relation to said cap.

2. An air vent cap for oil drums consisting of a cylindrical sleeve having an outturned flange at one end thereof, a vented washer at one end of said sleeve having a conical surface on its sleeve engaging side and having a flange around same engaging the outer side of the sleeve normal to the surface of the conical face thereof, a cap on the flange end of said sleeve, a vented hub on said cap, a hand wheel over said cap having a depending flange spaced from and encircling said hub, said cap and hand wheel having registering holes formed therethrough for the reception of a lock, and a screw secured to said hand wheel journaling in said hub and threaded into said washer.

WORTH H. WORK.

References Cited in the file of this patent

UNITED STATES PATENTS

| Number | Name | Date |
|---|---|---|
| 899,291 | Brown | Sept. 22, 1908 |
| 1,240,682 | Crompton, Jr. | Sept. 18, 1917 |
| 2,117,473 | Glab | May 17, 1938 |
| 2,176,367 | Stough | Oct. 17, 1939 |